United States Patent [19]
Zaaijer et al.

[11] Patent Number: 5,514,938
[45] Date of Patent: May 7, 1996

[54] D.C. CIRUIT FOR STARTING HIGH PRESSURE DISCHARGE LAMP

[75] Inventors: Gerrit J. Zaaijer, deceased, late of Eindhoven; by Henricus J. Kunnen, legal represenative, Valkenswaard, both of Netherlands

[73] Assignee: U.S. Philips Corporation, New York, N.Y.

[21] Appl. No.: 328,306

[22] Filed: Oct. 24, 1994

[30] Foreign Application Priority Data

Oct. 29, 1993 [BE] Belgium ............................ 09301183

[51] Int. Cl.⁶ .................................................. G05F 1/00
[52] U.S. Cl. ................... 315/291; 315/200 R; 315/224; 315/308; 315/310; 315/DIG. 7
[58] Field of Search .................. 315/291, 200 R, 315/224, 226, 253, 265, 272, 283, 307, 308, DIG. 7, DIG. 5, 310

[56] References Cited

U.S. PATENT DOCUMENTS

| | | | |
|---|---|---|---|
| 4,748,381 | 5/1988 | Ganser et al. | 315/200 R |
| 4,775,822 | 10/1988 | Statnic et al. | 315/224 |
| 4,887,007 | 12/1989 | Almering et al. | 315/224 X |
| 5,369,339 | 11/1994 | Reijnaerts | 315/224 X |
| 5,369,340 | 11/1994 | Leyten | 315/307 |
| 5,414,327 | 5/1995 | Reijnaerts | 315/224 X |

FOREIGN PATENT DOCUMENTS

8901224  12/1990  Netherlands .

*Primary Examiner*—Benny Lee
*Assistant Examiner*—Haissa Philogene
*Attorney, Agent, or Firm*—Edward Blocker

[57] ABSTRACT

A circuit arrangement for igniting and operating a discharge lamp (La), provided with

- input terminals (K1,K2) for connection to a DC voltage source,
- a commutator (COM) coupled to the input terminals and provided with terminals (K3,K4) for connecting the discharge lamp (La), for commutating a current through the discharge lamp (La),
- a branch A which is conducting in both directions at least for alternating current, of which branch a first end is connected to an input terminal (K2) and a further end is connected to the commutator (COM), and which branch comprises an inductive element L shunted by a branch B which comprises a unidirectional element (D),
- a branch C which connects a further input terminal to the commutator (COM), and
- an ignition circuit (S) for igniting the discharge lamp. According to the invention, the unidirectional element (D)is so included in the branch B that the branch B conducts a current at least immediately after ignition of the discharge lamp (La). It is achieved thereby that a lamp operated by means of the circuit arrangement has good take-over properties.

The invention relates to a circuit arrangement for igniting and operating a discharge lamp, provided with

- input terminal for connection to a DC voltage source,
- a commutator coupled to the input terminals and provided with terminals for connecting the discharge lamp, for commutating a current through the discharge lamp,
- a branch A which is conducting in both directions at least for alternating current, of which branch a first end is connected to an input terminal and a further end is connected to the commutator, and which branch comprises an inductive element L shunted by a branch B which comprises a unidirectional element,
- a branch C which connects a further input terminal to the commutator, and
- an ignition circuit for igniting the discharge lamp.

7 Claims, 1 Drawing Sheet

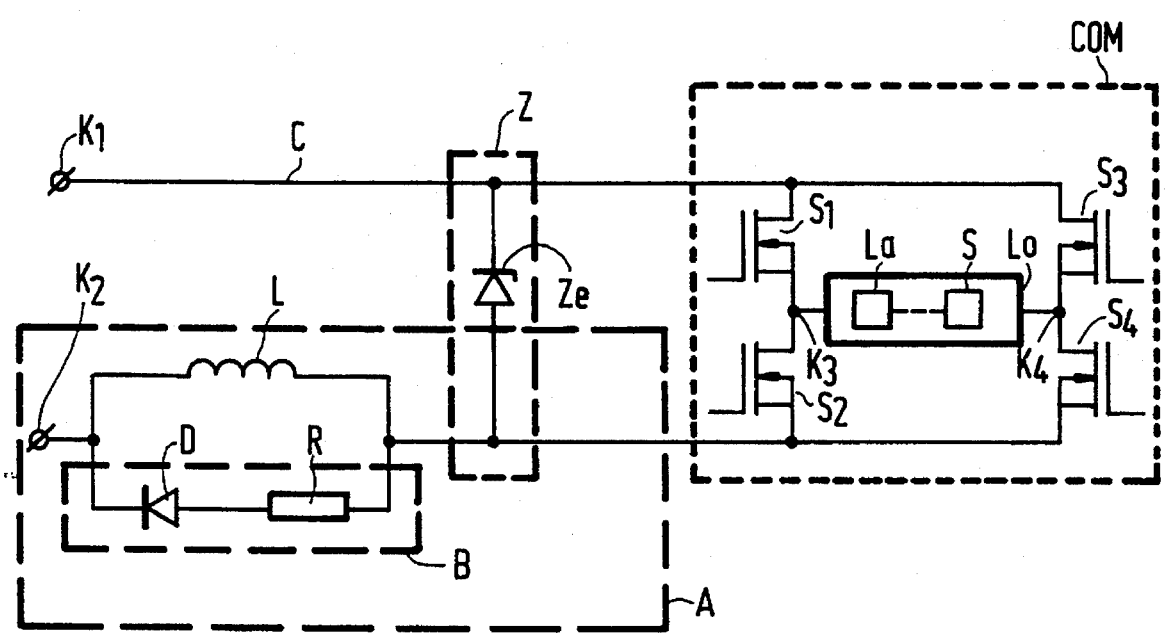

D.C. CIRUIT FOR STARTING HIGH PRESSURE DISCHARGE LAMP

BACKGROUND OF THE INVENTION

Such a circuit arrangement is known from published Netherlands Patent Application 8901224. The circuit arrangement described therein is particularly suitable for operating high-pressure discharge lamp, referred to as lamp hereinafter. The current through the lamp is low-frequency commutated during stationary lamp operation. The lamp as a result has a luminous efficacy which is substantially equal to the luminous efficacy obtained when the lamp is operated with a direct current, while overheating of the electrodes in the lamp is avoided. The inductive element L serves as a short-circuit protection: if there is a short-circuit in the commutator, the inductive element L limits the current supplied by the DC voltage source. The unidirectional element in branch B renders it possible for electromagnetic energy stored in the inductive element L during a short-circuit to be dissipated in branch B. A disadvantage of the known circuit arrangement is that the current flowing from the DC voltage source through the lamp immediately after lamp ignition is comparatively weak. This comparatively weak current is a result of the face that the unidirectional element is so connected that it cannot conduct part of the lamp current. The full lamp current flows through the inductive element, so that the speed with which the lamp current rises immediately after lamp ignition is limited. This limited current through the lamp immediately after lamp ignition causes a bad take-over, or possibly even lamp extinction. Take-over is here understood to mean the phase in lamp operation between lamp ignition and the moment a stable discharge between the electrodes is achieved.

SUMMARY OF THE INVENTION

The invention has for its object inter alias to provide a circuit arrangement which achieves a good take-over of the lamp after lamp ignition.

According to the invention, this object is achieved in that the unidirectional element is so included in the branch B that the branch B conducts a current at least immediately after ignition of the discharge lamp.

It was found that discharge lamps of the high-pressure discharge lamp type operated on a circuit arrangement according to the invention show a very good take-over behavior.

It was also found to be advantageous that the branch B comprises an impedance connected in series with the unidirectional element. Favorable results were obtained with embodiments of a circuit arrangement according to the invention in which this impedance comprises an ohmic resistor.

Depending on the dimensioning of the circuit arrangement and the properties of the lamp operated on the circuit arrangement, it may be desirable to limit the potential difference between branch A and branch C in that branch A and branch C are connected by means of a branch Z which comprises voltage-limiting means. Preferably, these voltage-limiting means comprise a zener diode.

Embodiments of a circuit arrangement according to the invention will be explained in more detail with reference to a drawing.

BRIEF DESCRIPTION OF THE DRAWINGS

In the drawing, FIG. 1 is a diagram of an embodiment of a circuit arrangement according to the invention.

DETAILED DESCRIPTION OF THE PREFERRED EMBODIMENTS

In FIG. 1, K1 and K2 are terminals for connection to a DC voltage source. COM is a commutator built up from four switching elements S1, S2, S3 and S4. A load Lo comprising a lamp La and a starter circuit S coupled to the lamp La for igniting the lamp is connected to the commutator COM. The coupling between La and S is indicated with a broken line in the FIGURE. Input terminal K1 is connected to a first main electrode of switching element S1. This connection in the present embodiment forms branch C. Branch A is formed by the connection between input terminal K2 and a main electrode of switching element S2. Coil L in this embodiment forms an inductive element which forms pan of branch A. A series circuit of diode D and ohmic resistor R in this embodiment forms branch B which is part of branch A. Zener diode Ze in this embodiment forms branch Z, and at the same time voltage-limiting means comprised in branch Z. A first side of coil L is connected to input terminal K2 and also to a cathode of diode D. An anode of diode D is connected to a first side of resistor R. A further side of resistor R is connected to a further side of coil L and to an anode of zener diode Ze. A cathode of zener diode Ze is connected to input terminal K1. Zener diode Ze is shunted by a series circuit of switching element S1 and switching element S2, and also by a series circuit of switching element S3 and switching element S4. Control electrodes of the switching elements S1 to S4 are connected to a control circuit (not shown) which forms pan of the commutator COM. Terminal K3 is connected to a common junction point of switching element S1 and switching element S2. Terminal K4 is connected to a common junction point of switching element S3 and switching element S4. Terminal K3 and terminal K4 are connected to respective ends of the lamp La.

The operation of the circuit arrangement shown in FIG. 1 is as follows.

When input terminals K1 and K2 are connected to a DC voltage source, the starter circuit S generates an ignition voltage which is present between terminals connected to the lamp electrodes. A discharge is generated in the lamp under the influence of the ignition voltage. If the lamp is a high-pressure discharge lamp, lamp operation subsequent to lamp ignition can be subdivided into three consecutive phases. During the first two phases, the voltage across the lamp rises from a comparatively low value to a value corresponding to stationary lamp operation. At the same time, the current through the lamp changes from a comparatively strong current to a current corresponding to stationary lamp operation. Lamp operation is stationary in the third phase. In the first phase, in which the take-over of the lamp takes place, immediately after the ignition has been achieved, the impedance of the lamp is low and a comparatively strong current flows through the lamp via the conducting switching elements, ohmic resistor R, diode D and coil L during a comparatively short time interval. The amplitude of this comparatively strong current is substantially fully determined in a given lamp by the resistance value of the ohmic resistor R. The voltage across the resistor R and the diode D governs the rate at which the current through the coil L increases. This comparatively strong lamp current during the first phase of lamp operation is important for realizing a good take-over of the lamp. The portion of the lamp current flowing through the coil L is substantially zero immediately after lamp ignition and then rises gradually. To be able to supply the comparatively strong lamp current during the first phase, the DC voltage source may be provided, for example, with an output capacitor connected between input terminals K1 and K2. In the beginning of the first phase, the comparatively strong current is realized in that the capacitor discharges itself through the lamp. During discharging of the capacitor the quantity of current flowing through the coil L increases. When in a later stage of the first phase the output capacitor has been partly discharged, the comparatively strong current through the lamp may also be partly realized, depending on the dimensioning of the circuit, in that the coil L carries part of this current and allows no comparatively fast changes in this part of the current. During the second phase, which is also called the run-up of the lamp, and which takes much longer than the first phase, a current flows through the lamp which is considerably weaker than that during the first phase. The control circuit renders switching elements S1 and S4 and switching elements S2 and S3, respectively, alternately conducting and non-conducting. As a result, the commutator changes the direction of the lamp current with low frequency in order to prevent overheating of the lamp electrodes. During these commutations, however, the current through the lamp becomes substantially zero, so that the lamp extinguishes and has to be re-ignited. Since the temperature of the lamp is still comparatively low during the second please of lamp operation, the DC voltage supplied by the DC voltage source is insufficient for re-igniting the lamp comparatively quickly. The coil L, however, carries a comparatively large portion of the current through the lamp during the second phase of lamp operation. As a result of this the coil L generates a voltage whenever the current through the lamp is interrupted during a commutation owing to the fact that the lamp does not re-ignite immediately. Thus the lamp can re-ignite at a re-ignition voltage which is equal to the sum of the DC voltage supplied by the DC voltage source and the voltage generated by the coil L. This comparatively high re-ignition voltage leads to a comparatively quick re-ignition of the lamp during commutations. In the third phase, i.e. stationary lamp operation, lamp temperature is such that the lamp re-ignites substantially immediately at the DC voltage supplied by the DC voltage source.

It has thus become possible by means of a circuit arrangement according to the invention to send a comparatively strong current through a lamp operated on the circuit arrangement immediately after lamp ignition. It is also possible to generate a re-ignition voltage during the second phase of lamp operation at which the lamp re-ignites comparatively quickly during a commutation. As a result of these two properties, a lamp operated on a circuit arrangement according to the invention has good take-over characteristics and also good run-up characteristics.

With the use of a practical embodiment of a circuit arrangement as shown in FIG. 1, a xenon high-pressure lamp with a power rating of approximately 35; W was ignited by the starter circuit at a voltage of approximately 600 V. Immediately after ignition the voltage across the lamp was approximately 20 V. During the first phase of lamp operation, which lasts approximately 0.2 ms, a current pulse with an amplitude of approximately 8 A flowed through the lamp. During the second phase, the amplitude of the current through the lamp dropped from approximately 2.6 A to approximately 0.4 A. During re-ignition of the lamp in the beginning of the second phase of lamp operation, the DC voltage of approximately 40 V supplied by the DC voltage source was augmented by voltage pulses generated by the coil L with an amplitude of approximately 500 V The amplitude of the voltage pulses generated by the coil decreased to substantially zero volts during the lamp run-up. DURing stationary operation, the voltage across the lamp was approximately 85 V and the current through the lamp approximately 0.4 A.

It is claimed:

1. A circuit arrangement for igniting and operating a discharge lamp, said circuit arrangement comprising:
   (a) first and second input terminals for connection to a DC voltage source, said first input terminal being negatively poled,
   (b) a commutator coupled to the input terminals for commutating a current through the discharge lamp,
   (c) a branch A having first and second ends and which is capable of conducting in both directions at least for alternating current, said branch A first end being connected to a first input terminal, said branch A second end being connected to the commutator, said branch A further comprising an inductive element L shunted by a branch B, said branch B further comprising a unidirectional element having cathode and anode electrodes,
   (d) a branch C connecting the second input terminal to the commutator,
   (e) an ignition circuit for igniting the discharge lamp, characterized in that:
   (f) the cathode of the unidirectional element in branch B is connected to the first input terminal and the anode of the unidirectional element is connected to the commutator such that the branch B conducts current at least immediately after ignition of the discharge lamp.

2. A circuit arrangement for igniting and operating a discharge lamp as claimed in claim 1, wherein the branch B comprises an impedance element connected in series with the unidirectional element.

3. A circuit arrangement for igniting and operating a discharge lamp as claimed in claim 2, wherein the impedance element comprises an ohmic resistor.

4. A circuit arrangement for igniting and operating a discharge lamp as claimed in claim 1, further comprising a branch Z connecting branch A and branch C and comprising voltage-limiting means.

5. A circuit arrangement for igniting and operating a discharge lamp as claimed in claim 4, wherein the voltage-limiting means comprises a zener diode.

6. A circuit arrangement for igniting and operating a discharge lamp as claimed in claim 1, wherein the discharge lamp is a high pressure discharge lamp.

7. A circuit arrangement for igniting and operating a discharge lamp as claimed in claim 1, wherein the discharge lamp is a xenon high-pressure lamp.

\* \* \* \* \*